United States Patent
Bengtsson (10) Patent No.: US 8,757,605 B2
(45) Date of Patent: Jun. 24, 2014

(54) ARRANGEMENT AT A VICE OR A CHUCK

(76) Inventor: Lars Bengtsson, Bromma (SE)

( * ) Notice: Subject to any disclaimer, the term of this patent is extended or adjusted under 35 U.S.C. 154(b) by 135 days.

(21) Appl. No.: 13/501,100

(22) PCT Filed: Oct. 8, 2010

(86) PCT No.: PCT/SE2010/051089
§ 371 (c)(1),
(2), (4) Date: Apr. 10, 2012

(87) PCT Pub. No.: WO2011/046495
PCT Pub. Date: Apr. 21, 2011

(65) Prior Publication Data
US 2012/0193856 A1    Aug. 2, 2012

(30) Foreign Application Priority Data

Oct. 12, 2009 (SE) ...................... 0950750

(51) Int. Cl.
*B25B 1/10* (2006.01)
*B25B 5/10* (2006.01)
*B25B 1/24* (2006.01)
*B25B 5/16* (2006.01)

(52) U.S. Cl.
USPC ............................ 269/279; 269/242; 269/282

(58) Field of Classification Search
USPC ......................... 269/279, 282, 242
See application file for complete search history.

(56) References Cited

U.S. PATENT DOCUMENTS

| | | | | | |
|---|---|---|---|---|---|
| 1,018,528 | A | * | 2/1912 | Suddarth | 81/178 |
| 1,531,377 | A | * | 3/1925 | Clarke | 81/90.5 |
| 3,575,435 | A | * | 4/1971 | Lemanski | 279/123 |
| 4,133,519 | A | * | 1/1979 | Shin et al. | 269/247 |
| 4,240,621 | A | * | 12/1980 | Daddato | 269/264 |
| 4,645,411 | A | * | 2/1987 | Madwed | 414/753.1 |
| 4,858,902 | A | * | 8/1989 | Hickman | 269/88 |
| 5,048,808 | A | * | 9/1991 | Yang | 269/258 |
| 5,060,920 | A | * | 10/1991 | Engibarov | 269/282 |
| 5,092,572 | A | * | 3/1992 | Litwak et al. | 5/600 |
| 5,096,172 | A | * | 3/1992 | Mills et al. | 269/136 |
| 5,579,667 | A | * | 12/1996 | Kim | 81/185.1 |
| 5,904,358 | A | | 5/1999 | Hosono et al. | |
| 7,537,255 | B2 | * | 5/2009 | Key et al. | 294/198 |
| 2003/0098538 | A1 | | 5/2003 | Dermody | |
| 2004/0124573 | A1 | * | 7/2004 | Elman et al. | 269/279 |
| 2006/0055098 | A1 | * | 3/2006 | Siegel | 269/279 |

FOREIGN PATENT DOCUMENTS

GB    316479    8/1929

OTHER PUBLICATIONS

International Search Report dated Jan. 3, 2011, corresponding to PCT/SE2010/051089.

* cited by examiner

*Primary Examiner* — Lee D Wilson
*Assistant Examiner* — Alvin Grant
(74) *Attorney, Agent, or Firm* — Young & Thompson (57) ABSTRACT

An arrangement at a vice or chuck, where a jaw insert (22) in the vice or chuck is arranged such that it can be rotated around at least one axis (A) such that a holding surface (23) of the jaw insert, which holding surface is turned to face a second holding surface (26) on a second jaw insert (25), can be displaced by rotation of the jaw insert (22) around the axis (A) from its normal holding position facing the second holding surface (26) to a working position in which the holding surface (23) does not face the second holding surface (26) and in which it can be accessed for working.

20 Claims, 6 Drawing Sheets

ARRANGEMENT AT A VICE OR A CHUCK

The present invention concerns an arrangement at a vice or a chuck, and in particular an arrangement to achieve the ability to work simply jaw inserts in the vices and chucks. The invention solves also the problem of making possible working and function of the jaw insert, given one and the same attachment, without losing knowledge of its position relative to the machine.

The holding of workpieces with the aid of vices and chucks is known. The position of a workpiece in a holding arrangement is often determined by fixed faceplates. Another characteristic that is known is to work jaw inserts that are mounted into a vice or a chuck, as are also interchangeable jaw inserts.

During the working of jaw inserts in traditional vices or chucks the holding surface of the jaw insert, which is the surface that is perpendicular to the holding force, is not easily accessible for working, since it normally is turned to face a second holding surface. The jaw insert is, for this reason, normally worked separately, and it is then mounted into the vice or chuck.

The purpose of the present invention, therefore, is to achieve an arrangement such that a jaw insert for a vice or a chuck can remain in the vice or chuck during working of the jaw insert itself, and then such that it is possible to prepare the jaw insert simply and rapidly for holding of the intended workpiece in the vice or chuck without it being necessary in this way to readjust it with respect to its exact location.

The above-mentioned purpose [sic, missing "is achieved"?] with an arrangement in which a jaw insert in a vice or chuck is arranged such that it can be rotated around at least one axis such that a holding surface of the jaw insert, which holding surface is turned to face a second holding surface on a second jaw insert, can be displaced by rotation of the jaw insert around the axis from its normal holding position facing the second holding surface to a working position in which the holding surface does not face the second holding surface and in which it can be accessed for working.

According to one preferred embodiment of the invention, the holding surface has been rotated when in its working position by approximately 90° from its holding position.

According to a further preferred embodiment of the invention, is the at least one axis [sic "at least one of the axes is an axis"] that demonstrates a gradient of approximately 45° relative both to the plane of the holding position and to the plane of the working position.

Through rotation of the jaw insert by 180° around such an axis of rotation, the holding surface of the jaw insert can be displaced from a position at which it is perpendicular to the holding force that acts on the jaw insert when in its holding position to a position in which it is parallel to the holding force.

Such a construction can be designed also such that two or more axes of rotation give positions after the completion of the rotation movement that correspond to the position achieved if only one axis of rotation had contributed to the movement.

The invention will now be described in more detail in the form of a pair of drawings that make clear the principle of the rotation of the jaw inserts, and in the form of a non-limiting embodiment, which is revealed in the attached drawings, where.

Figure 1:
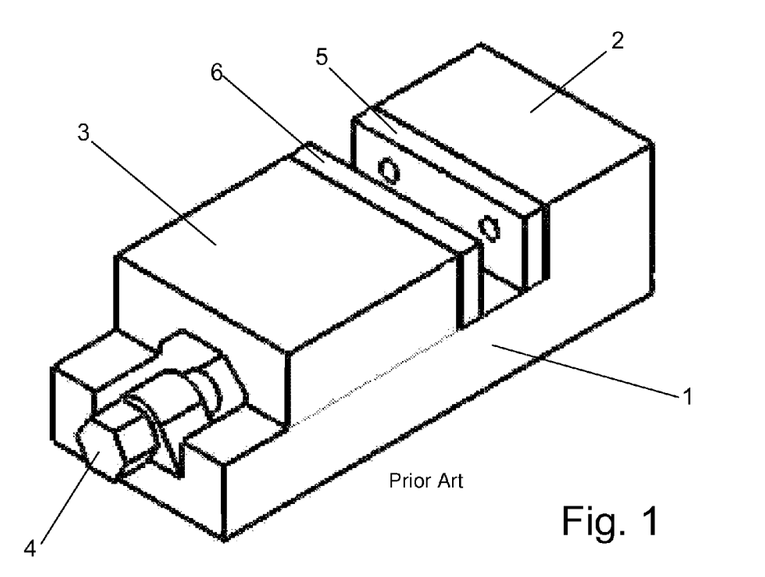
FIG. 1 shows a perspective view of a traditional vice.

FIG. 1 thus shows a traditional vice with a base 1, a fixed counterholder 2 and a displaceable slider 3, which can be displaced towards and away from the fixed holder 2 with the aid of a screw arrangement 4. The fixed counterholder 2 has a jaw insert 5 attached at the surface that faces the displaceable slider 3, and in a corresponding manner the displaceable slider 3 has a jaw insert 6 attached at the surface that faces the fixed counterholder 2. The surfaces of the two jaw inserts that face each other are the holding surfaces of the jaw inserts, i.e. they are the surfaces between which it is to be possible for a workpiece to be held fixed for working. The jaw inserts 5, 6 are attached to the relevant fixed part 2 or displaceable part 3 with the aid of screws. It is difficult to gain access to work the holding surfaces of the jaw inserts 5, 6 when the jaw inserts are mounted onto the fixed counterholder 2 and the displaceable slider 3, respectively, and it is in practice always necessary to remove completely the jaw inserts 5, 6 with the aid of the screws and remove them for working. For this to be possible, it is necessary also that the displaceable slider 3 is screwed out from the fixed counterholder 2 such that it is possible to gain access to the screws that hold the jaw inserts to unscrew them.

Figure 2A:
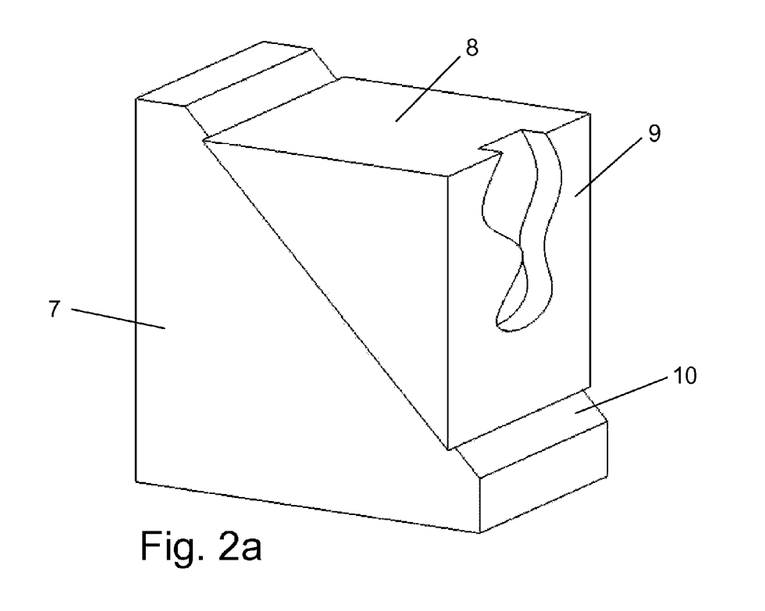
FIG. 2a shows a principle view of a jaw insert for a vice in its holding position.

FIG. 2a shows in principle how a slider 7, or a fixed counterholder, is provided with a jaw insert 8, which has on one side a holding surface 9, which in this case has been made visible with a milled out area, intended to be able to receive the end of a workpiece, not shown in the drawing. The jaw insert 8 in the example shown is principally designed as a triangle, with its oblique surface facing a corresponding oblique surface 10 on the slider 7. The jaw insert 8 is so arranged on the slider 7 that it can be rotated around an axis that passes perpendicular to the oblique surface 10.

Figure 2B:
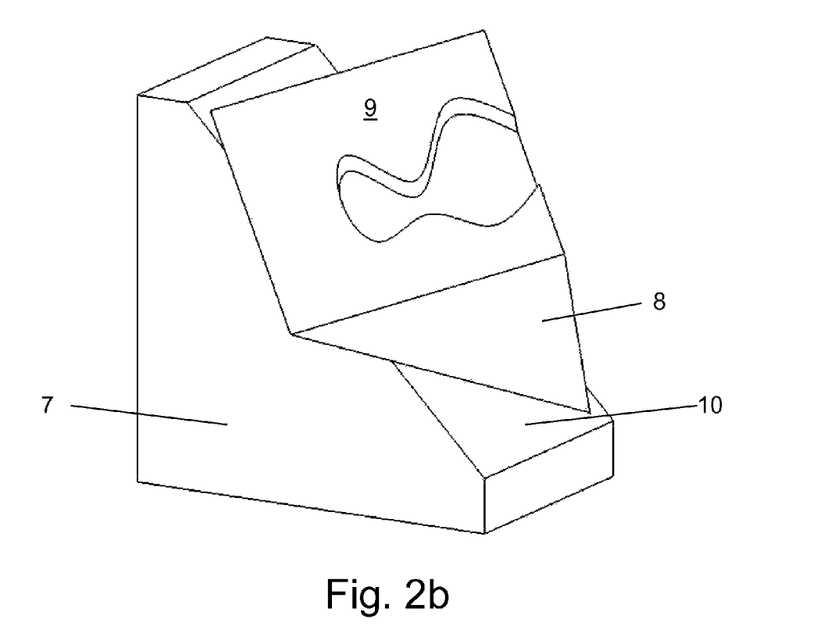
FIG. 2b shows a principle view of a jaw insert for a vice during rotation.
Figure 2C:
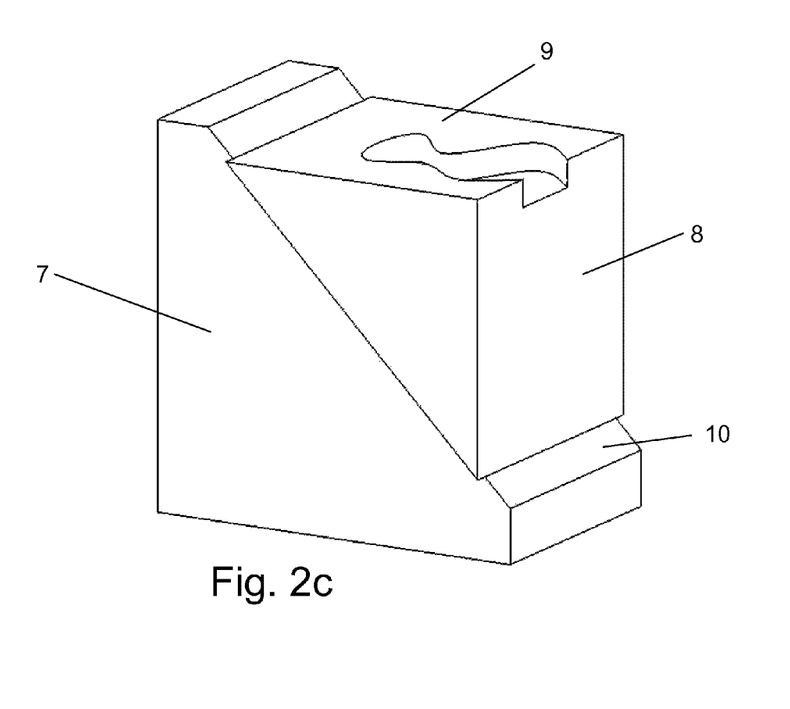
FIG. 2c shows a principle view of a jaw insert for a vice in a position in which it can be worked.

FIG. 2b shows a condition in which the jaw insert 8 has been rotated somewhat relative to the slider 7 from the view shown in FIG. 2a, and FIG. 2c shows the condition in which the jaw insert has been rotated so far that the holding surface 9 of the jaw insert 8 is now located in a plane that is perpendicular to the plane in which the holding surface 9 was located as it is shown in FIG. 2a. The jaw insert 8 has been rotated through 180° between the condition in FIG. 2a and that in FIG. 2c, and the holding plane 9 has through this rotation been rotated through 90°, and this means that when a jaw insert having such a design is applied to a vice, it will be possible to rotate the jaw insert from a holding position at which it is not accessible for working to a working position in which it is readily accessible.

Figure 3A:
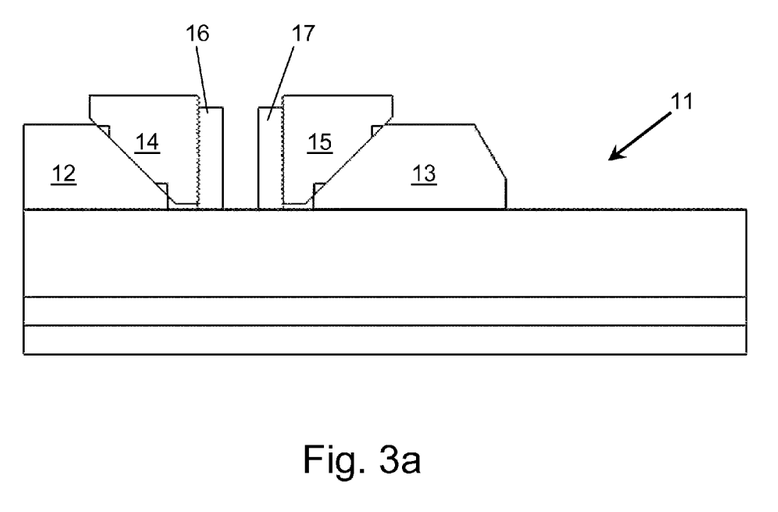
FIG. 3a shows a schematic side view of a vice with jaw inserts according to the invention [sic, missing "in its"] holding position.

FIG. 3a shows a schematic side view of a vice 11 with a fixed counterholder 12 at one end and a displaceable slider 13. A jaw insert 14 is arranged at the fixed counterholder 12 and a jaw insert 15 is arranged at the displaceable slider 13, and the drawing makes it clear that the interfaces between the fixed faceplate 12 and the jaw insert 14, and the interface between the displaceable slider 13 and its jaw insert 15 demonstrate a gradient to the horizontal plane of the vice 11 of approximately 45°. The two jaw inserts 14, 15 are provided with faceplates 16, 17, which are the parts that come into direct contact with the workpiece that can be held fast in the vice 11, and it is actually these faceplates 16, 17 that are to be accessible for working. Thus the holding surfaces of the faceplates 16, 17 face each other in FIG. 3*a*. The crucial point is that the surfaces at which the faceplates 16, 17 are attached can be placed into a working position through rotation in the same holding condition, and retain knowledge of both the original and the new position. It is, of course, not necessary that the faceplates be separate: they may be a surface of the jaw inserts.

Figure 3B:
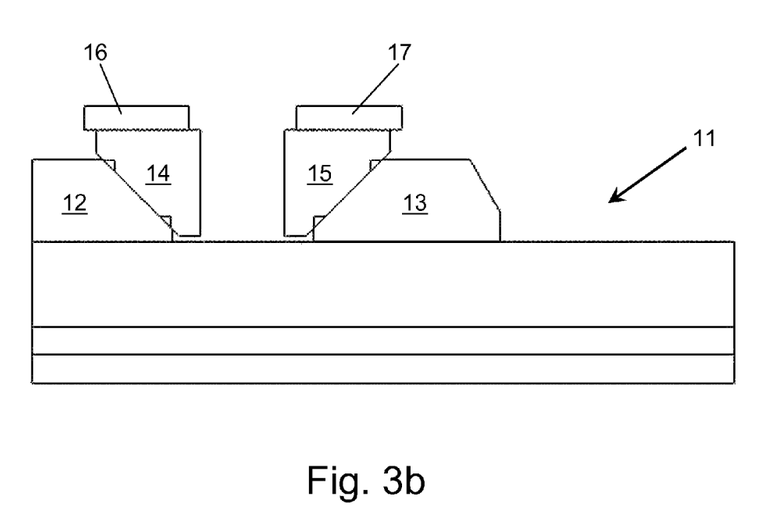
FIG. 3b shows a schematic side view of a vice with jaw inserts according to the invention in its working position.

FIG. 3*b* shows a view corresponding to that in FIG. 3*a* but it has the difference that the two jaw inserts 14, 15 have been rotated by 180°, and their faceplates have in this way been rotated to face upwards, which means that the holding surfaces of the two faceplates 16, 17 are easily accessible for working.

Figure 4:
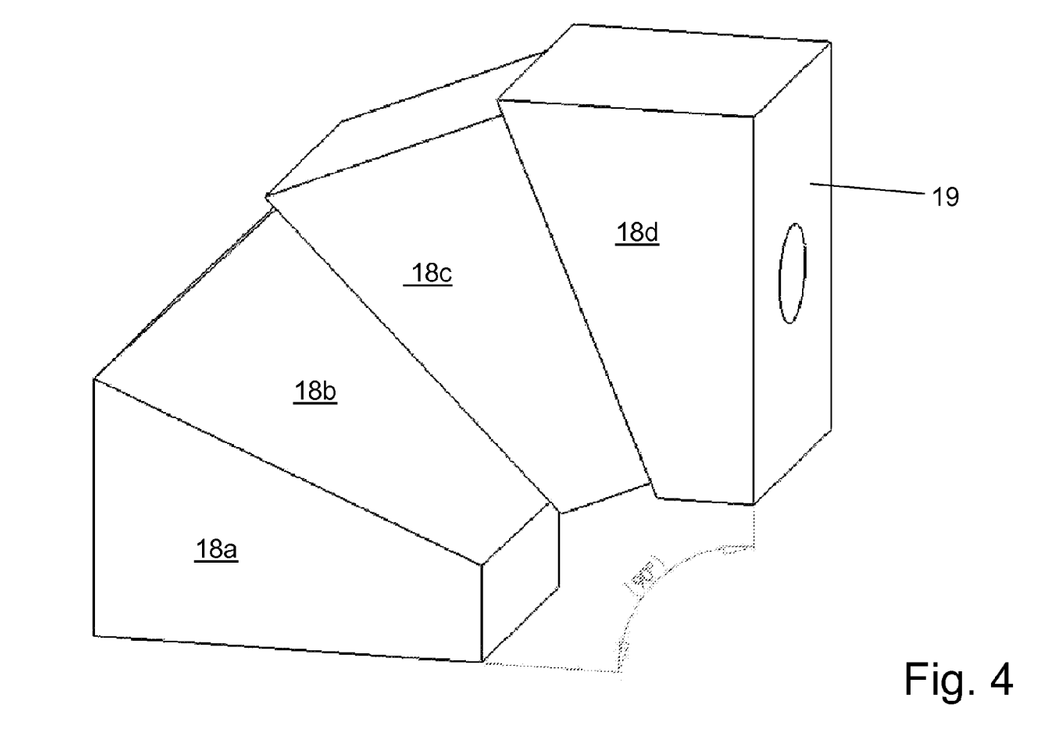
FIG. 4 shows a principle view of a jaw insert that can be rotated around several axes.

FIG. 4 shows schematically how a jaw insert may be formed from more than two interacting parts, namely the bottom part 18*a*, the first intermediate part 18*b*, the second intermediate part 18*c* and the holder 18*d*. The holder 18*d* has a holding surface 19, which in this case has been rotated 90° relative to the bottom surface of the bottom part 18*a*. The various interacting parts are united through three axes in a manner that allows rotation, and the parts are brought through, for example, rotation of the parts 18*b*, 18*c* and 18*d* each in turn by 180° relative to the underlying part, to an arrangement in which they are in principle located vertically above each other and where when [sic, extra "when"] the holding surface 19 of the holder 18*d* is arranged parallel to the bottom surface of the bottom part 18*a*.

Figure 5:
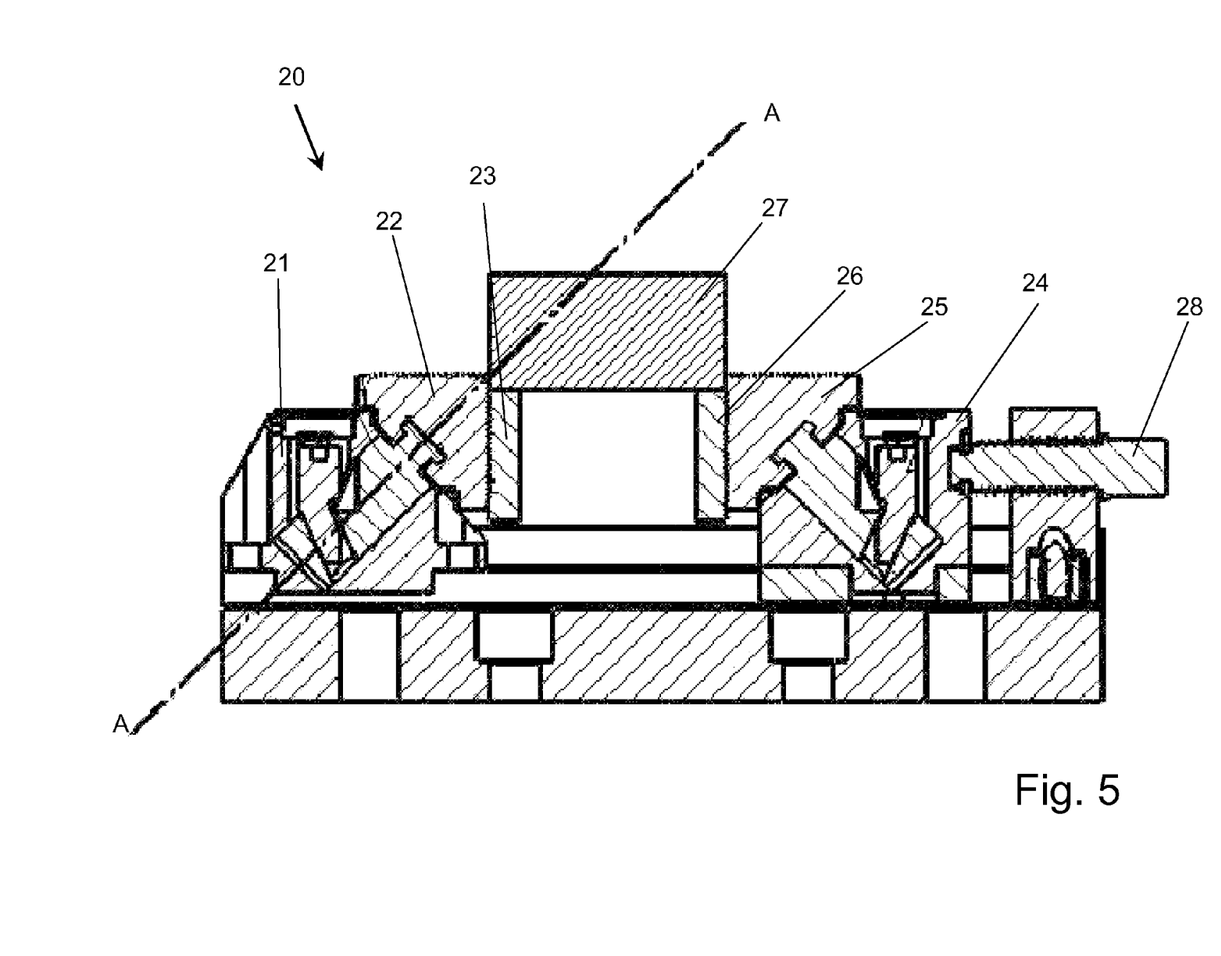
FIG. 5 shows a sectional view of a vice with jaw inserts according to the invention.
Figure 6:
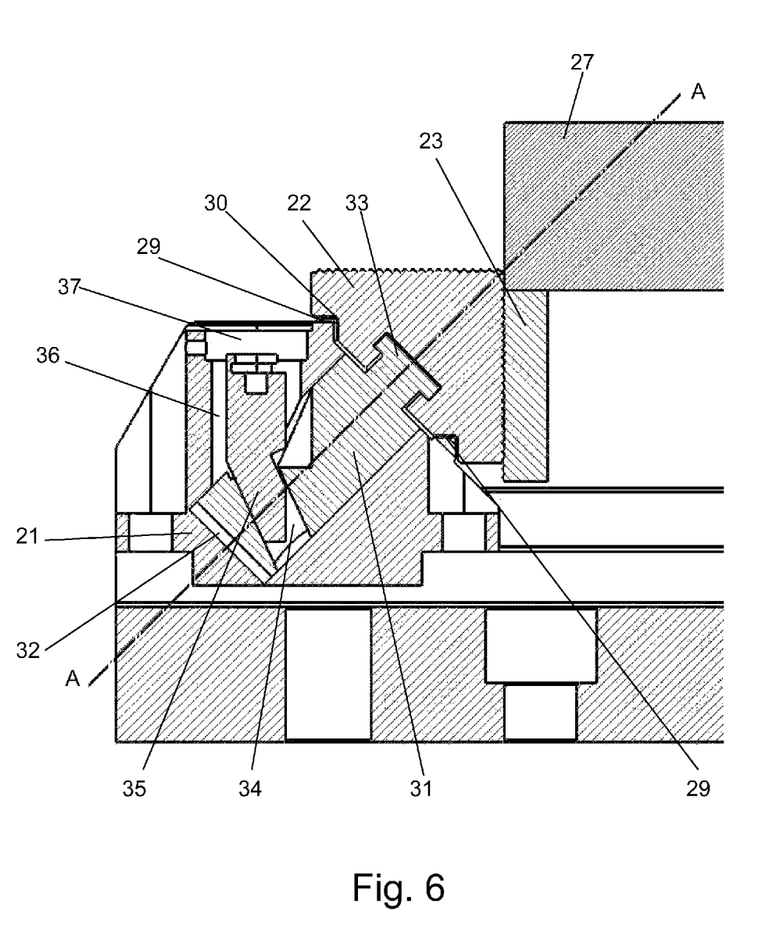
FIG. 6 shows at greater scale a sectional view through one of the jaw inserts in the vice in FIG. 5.

FIG. 5 shows how a vice 20 can be designed according to the invention according to one preferred embodiment, and FIG. 6 shows the left part of FIG. 5 at a larger scale. A first attachment part, a fixed counterholder with a fixed bottom part 21 is arranged on the left side, as seen in the drawing, and a jaw insert 22 united with this, which jaw insert is provided on one of its sides with a faceplate 23. The vice demonstrates also a second attachment part, a slider 24 that can be displaced along the vice, which also demonstrates a jaw insert 25 united with it, and which also is provided at one of its sides with a faceplate 26. The two faceplates 23, face each other in the holding condition shown, and a workpiece 27 is shown in FIG. 5, which in this case rests on the faceplates 23, 26 and is held fast between the jaw inserts 22, 25. Alternatively, the workpiece 27 may be located such that it is held fast between the surfaces of the faceplates 23, 26 that face each other, the holding surfaces. The displaceable slider 24 with the jaw insert 25 is arranged in known manner with the aid of a screw arrangement 28 such that it is possible to displace it towards or away from the fixed counterholder for fastening or removal, respectively, of a workpiece 27.

The fixed bottom part 21 of the fixed counterholder is, as is most clearly shown by FIG. 6, provided with a surface that has a gradient of approximately 45°, on which it is intended that a surface of the jaw insert 22 with a similar gradient of approximately 45° is to be located. Two protruding pegs 29 are arranged at the oblique surface of the bottom part, which pegs form contact surfaces for corresponding recesses 30 in the oblique surface of the jaw insert 22. Through the design of the pegs 29 shown it is possible to achieve reference surfaces on both the bottom part 21 and the jaw insert 22 in two perpendicular directions for attachment of the jaw insert 22 to the bottom part 21. These reference surfaces may be accurately machined in order to obtain an exact positioning of the jaw insert 22 relative to the bottom part 21. It is not necessary that the reference surfaces be perpendicular to each other, but this is a preferred design. They may, however, have other angles, under the condition that corresponding angles are present on both the bottom part and the jaw insert. It is possible also for the reference surfaces to have any form at all.

In addition, a draw plug 31 is arranged in the fixed bottom part 21, which draw plug is arranged perpendicular to the oblique surface of the fixed bottom part and arranged such that it is possible to displace it somewhat along its longitudinal direction, shown by the dash-dot line A, in a hole 32 that is located in the fixed bottom part 21. The draw plug 31 has at its upper end a collar 33 that is located within a corresponding recess in the jaw insert 22, such that the draw plug 31 can displace the jaw insert 22 along the direction of the line A, in order to release the jaw insert 22 from the fixed bottom part 21 or tighten it to achieve accurate contact with the reference surfaces of the pegs 29.

The draw plug 31 is provided also with an oblique hole 34, into which a wedge 35 can protrude. This wedge 35 is arranged in an essentially vertical drilled feature 36 in the fixed bottom part, and the wedge 35 is provided at its lower end with an oblique wedge component intended to protrude into the oblique hole 34 of the draw plug. The wedge 35 is united also with an adjustment screw 37 inserted into the upper part of the drilled feature 36, and it is arranged such that it can displace through its rotation the wedge 35 inwards or outwards in the drilled feature 36, and in this way be able to influence the draw plug 31 to be displaced inwards into the hole 32 of the bottom part in order to tighten the jaw insert 22 against the fixed bottom part 21, or displaced in the opposite direction and in this way achieve loosening of the jaw insert from its contact with the fixed bottom part.

It is thus possible by loosening the adjustment screw 37 and in this way at least partial withdrawal of the wedge 35 from the drilled feature 36 in the draw plug 31 to remove the compressive force of this on the jaw insert 22 such that the jaw insert can be turned 180° around the axis A and in this way displace the faceplate 23 from its position facing the faceplate 26 on the displaceable slider 24 such that it faces directly upwards and is thus accessible for working. In such a rotated condition of the jaw insert 22 and thus of the faceplate 23, these can again be fixed relative to the fixed bottom part by once again tightening the adjustment screw 37 and in this way also the draw plug 31, such that the jaw insert 22 is fixed in this position and can thus be accurately worked. When the working is subsequently complete, a corresponding operation is carried out in order to return the jaw insert 22 and the faceplate 23 to the condition shown in FIGS. 5 and 6.

The jaw insert 25 of the displaceable slider 24 is arranged in the same manner as the manner described above for the jaw insert 22 and the fixed bottom part 21.

It may be necessary, however, to fix the jaw insert 25 when the faceplate 26 is being worked. This can take place through the displaceable slider 24 being locked with the aid of a locking screw, whereby no spacer element is required, or alternatively through the insertion under tension of a spacer element between the jaw inserts 22, 25 in this working condition.

It has been described above that the draw plug 31 is arranged such that it can be displaced along the direction of the line A, which can be regarded also as the axis around which it is possible to rotate the jaw insert 22. It is appropriate that this axis A has a gradient of approximately 45° to the plane of the vice, i.e., essentially the horizontal plane, but it is possible to have also other gradients for this axis, without deviating from the invention. What is essential is that the jaw insert and the faceplate can be easily and in an exact manner rotated from a holding position to a working position at which the faceplate of the jaw insert is readily available for working.

It may be the case, for example, that the surfaces of the two faceplates 23, 26 that face each other in the holding position are not exactly parallel with each other: it may be the case that they demonstrate a certain small mutual obliquity in order to provide release of the workpiece.

The jaw inserts have been shown as triangular in the embodiment shown, but it will be obvious for one skilled in the arts that the jaw inserts may have another form such that, for example, the contact surface between jaw insert and fixed bottom part or displaceable slider is a rounded surface, or a surface that has several steps.

It has been specified in the embodiments also that one of the jaw inserts is fixed arranged in the vice while the other can be displaced towards and away from the first jaw insert in the principal plane of the vice. It is, however, fully possible for both of the jaw inserts to be arranged such that they can be displaced, in a centering holding system. The holding surfaces in a vice are then normally located in two planes that are parallel to each other and perpendicular to the principal plane of the vice.

The jaw inserts in a chuck are normally arranged such that they form a centering holding system, where the jaw inserts are arranged such that they can be displaced in the principal plane of the chuck. There are normally three jaw inserts in a chuck, arranged mutually at an angle of 120°, and thus their holding surfaces are positioned at a corresponding angle relative to each other. It may, however, be advantageous that the holding surfaces face the same direction in the working position, but it is, of course, also possible that they face different directions, such as radially outwards.

It is obvious also that the jaw inserts can be composed of several parts that can be rotated relative to each other as has been illustrated in FIG. 4.

The preferred embodiment has been described in the description above in which the axis around which the jaw inserts are rotated is located at an angle of approximately 45° to the principal plane of the vice or chuck. This is, as has been mentioned, solely one preferred embodiment, and the axis can have any direction at all: it may be parallel to the principal plane or located at a right angle to it.

A design according to the invention in which one or several jaw inserts can be rotated around a known axis provides the possibility of using the arrangement in a CAD/CAM system, since the jaw insert is located in a known position relative to the reference point of the machine. Thus, the design is such that the knowledge of the position of the jaw insert is maintained during rotation, which is crucial for working in a CAD/CAM system.

The invention claimed is:

1. An arrangement at a vice or chuck, comprising:
   a base defining a principal plane of the vice or chuck;
   a first jaw insert (14; 22) with a first axis (A) arranged with a non-zero gradient to the principal plane of the vice or chuck, the jaw insert having a first holding surface (16; 23); and
   a second jaw insert (15; 25) with a second holding surface (17; 26),
   wherein the first jaw insert is rotatable around the first axis (A) such that the first holding surface is displaced, by rotation of the jaw insert (14; 22) around the first axis (A), from
   i) a normal holding position with the first hold surface facing the second holding surface (17; 26), to
   ii) a working position in which the first holding surface (16; 23) does not face the second holding surface (17; 26) and in which the first holding surface can be accessed for working.

2. The arrangement according to claim 1, wherein the first holding surface (16, 17) in the working position has been turned approximately 90° from the holding position.

3. The arrangement according to claim 1, wherein the first axis is an axis that demonstrates a gradient of approximately 45° relative both to the plane of the holding position and to the plane of the working position.

4. The arrangement according to claim 1, wherein the first jaw insert (22, 25) is attached through an attachment part (21, 24), and the attachment part (21, 24) is arranged such that the attachment part can be displaced along the principal plane of the vice or chuck.

5. The arrangement according to claim 1, wherein,
   the first jaw insert (22, 25) is attached through first and second attachment parts (21, 24),
   the first attachment part (21) is arranged fixed in the vice, and
   the second attachment part (24) is arranged such that the second attachment part (24) can be displaced along the principal plane of the vice or chuck.

6. The arrangement according to claim 4, wherein the first jaw insert (22, 25) is attached at the attachment part (21, 24) along a surface that demonstrates a gradient of approximately 45° relative to the vice or chuck.

7. The arrangement according to claim 4, wherein the first jaw insert (22, 25) and the attachment part (21, 24) demonstrate interacting reference surfaces for fixing the first jaw insert (22, 25) relative to the attachment part (21, 24).

8. The arrangement according to claim 4, wherein the first jaw insert (22, 25) is united with the attachment part (21, 24) with the aid of a draw plug (31) and arranged such that the first jaw insert can be rotated around this the draw plug.

9. The arrangement according to claim 8, wherein the draw plug (31) is arranged such that the draw plug can be displaced along a longitudinal direction in a hole in the attachment part (21, 24).

10. The arrangement according to claim 8, wherein the draw plug (31) can be displaced in the hole (32) with the aid of a wedge (35).

11. The arrangement according to claim 10, wherein the wedge (35) can be maneuvered with the aid of an adjustment screw (37).

12. The arrangement according to claim 1, wherein the second jaw insert (15; 25) can be displaced by rotation of the second jaw insert around an axis from a second jaw insert normal holding position to a second jaw insert working position in which the second holding surface (17; 26) faces in the same direction as the first holding surface (16; 23) in the working position of the first jaw insert.

13. The arrangement according to claim 12, further comprising at least one further jaw insert that comprises a holding surface, whereby also the further jaw insert can be displaced by rotation around an axis from a normal holding position to a working position at which the further holding surface faces in the same direction as the first holding surface and the second holding surface when in a working position.

14. The arrangement according to claim 1, wherein the arrangement can be used in a CAD/CAM system.

15. The arrangement according to claim 2, wherein the first axis is an axis that demonstrates a gradient of approximately 45° relative both to the plane of the holding position and to the plane of the working position.

16. The arrangement according to claim 5, wherein the first jaw insert (22, 25) is attached through an attachment part (21, 24), and the attachment part (21, 24) is arranged such that the attachment part can be displaced along the principal plane of the vice or chuck.

17. The arrangement according to claim 5, wherein the first jaw insert (22, 25) is attached through an attachment part (21, 24), and the attachment part (21, 24) is arranged such that the attachment part can be displaced along the principal plane of the vice or chuck.

18. The arrangement according to claim 6, wherein the first jaw insert (22, 25) is attached through an attachment part (21, 24), and the attachment part (21, 24) is arranged such that the attachment part can be displaced along the principal plane of the vice or chuck.

19. The arrangement according to claim 5, wherein the first jaw insert (22, 25) is united with the attachment part (21, 24) with the aid of a draw plug (31) and arranged such that the first jaw insert can be rotated around the draw plug.

20. The arrangement according to claim 9, wherein the draw plug (31) can be displaced in the hole (32) with the aid of a wedge (35).

* * * * *